United States Patent
Rampen et al.

(10) Patent No.: US 9,127,656 B2
(45) Date of Patent: Sep. 8, 2015

(54) RING CAM AND FLUID-WORKING MACHINE INCLUDING RING CAM

(75) Inventors: William Hugh Salvin Rampen, Edinburgh (GB); Uwe Bernhard Pascal Stein, Edingburgh (GB); Robert George Fox, Peebles (GB); Stephen Hugh Salter, Edinburgh (GB)

(73) Assignee: ARTEMIS INTELLIGENT POWER LIMITED, Loanhead (GB)

( * ) Notice: Subject to any disclaimer, the term of this patent is extended or adjusted under 35 U.S.C. 154(b) by 585 days.

(21) Appl. No.: 13/380,568

(22) PCT Filed: Jul. 19, 2011

(86) PCT No.: PCT/GB2011/051366
§ 371 (c)(1),
(2), (4) Date: May 2, 2012

(87) PCT Pub. No.: WO2012/022952
PCT Pub. Date: Feb. 23, 2012

(65) Prior Publication Data
US 2012/0312158 A1    Dec. 13, 2012

(51) Int. Cl.
*F03C 1/04* (2006.01)
*F04B 1/04* (2006.01)
(Continued)

(52) U.S. Cl.
CPC ............... *F04B 1/0413* (2013.01); *F01B 1/062* (2013.01); *F01B 1/0648* (2013.01); *F01B 9/06* (2013.01);
(Continued)

(58) Field of Classification Search
CPC .................................................. F03C 1/0409

USPC .................................................. 91/482; 92/72
See application file for complete search history.

(56) References Cited

U.S. PATENT DOCUMENTS

| 4,003,351 A | 1/1977 | Gunther |
| 4,048,906 A | 9/1977 | Firth et al. |

(Continued)

FOREIGN PATENT DOCUMENTS

| AU | 641438 | 9/1990 |
| CN | 101655069 | 2/2010 |

(Continued)

OTHER PUBLICATIONS

Rampen, Taylor, Riddoch, "Gearless transmission for large wind turbines" DEWEK, Bremen, 2006.

(Continued)

*Primary Examiner* — F. Daniel Lopez
(74) *Attorney, Agent, or Firm* — Lowe Hauptman & Ham, LLP

(57) ABSTRACT

A ring cam for a fluid-working machine is formed from a plurality of segments. The segments comprise a leading cooperating formation which has a piston facing surface which forms part of the working surface, at a trailing end, and which is recessed from the working surface at a leading end, and a trailing cooperating formation which has a piston facing surface which forms part of the working surface at a leading end, and which is recessed from the working surface at a trailing end. The segments having piston facing surfaces which are in compressive stress such as to partially or fully compensate for tensile stress arising from the action of rollers in use. The segments form a wavelike cam surface and attachment means are provided, through the working surface, on whichever of the leading or trailing surfaces thereof is subject to lowest forces from pistons in use.

13 Claims, 2 Drawing Sheets

(51) Int. Cl.

| | | |
|---|---|---|
| *F01B 1/06* | (2006.01) | |
| *F01B 9/06* | (2006.01) | |
| *F03C 1/30* | (2006.01) | |
| *F03C 1/053* | (2006.01) | |
| *F04B 1/053* | (2006.01) | |
| *F04B 9/04* | (2006.01) | |
| *F04B 17/02* | (2006.01) | |
| *F16H 53/02* | (2006.01) | |

(52) U.S. Cl.
CPC ............... *F03C 1/04* (2013.01); *F03C 1/0409* (2013.01); *F03C 1/053* (2013.01); *F04B 1/04* (2013.01); *F04B 1/053* (2013.01); *F04B 9/042* (2013.01); *F04B 17/02* (2013.01); *F16H 53/025* (2013.01); *Y10T 74/2101* (2015.01)

(56) References Cited

U.S. PATENT DOCUMENTS

| | | | |
|---|---|---|---|
| 4,104,956 A | 8/1978 | Kato | |
| 4,192,203 A | 3/1980 | Dailey | |
| 4,287,792 A | 9/1981 | Dailey | |
| 4,359,312 A | 11/1982 | Funke et al. | |
| 4,503,673 A | 3/1985 | Schachle et al. | |
| 4,503,751 A | 3/1985 | Pinson | |
| 4,598,628 A | 7/1986 | Courtright | |
| 4,781,025 A | 11/1988 | Christ | |
| 5,037,356 A * | 8/1991 | Gladczak et al. | 474/95 |
| 5,259,738 A | 11/1993 | Rampen et al. | |
| 5,657,681 A | 8/1997 | Henricson | |
| 6,006,429 A | 12/1999 | Duell et al. | |
| 6,681,571 B2 * | 1/2004 | Bailey et al. | 60/489 |
| 6,837,141 B1 | 1/2005 | Edelson | |
| 7,863,767 B2 | 1/2011 | Chapple et al. | |
| 2006/0002802 A1 | 1/2006 | Lemaire et al. | |
| 2009/0092511 A1 | 4/2009 | Jiang | |
| 2010/0040470 A1 | 2/2010 | Nies et al. | |

FOREIGN PATENT DOCUMENTS

| | | |
|---|---|---|
| DE | 3113737 | 10/1982 |
| DE | 4026264 | 2/1992 |
| EP | 0692071 | 3/1994 |
| EP | 1101939 | 5/2001 |
| EP | 2151574 | 7/2009 |
| EP | 2154368 | 7/2009 |
| FR | 372703 | 2/1906 |
| GB | 391529 | 5/1933 |
| GB | 1026964 | 4/1966 |
| GB | 1255006 | 3/1968 |
| GB | 1261172 | 1/1972 |
| GB | 2046353 | 11/1980 |
| JP | S489048 | 3/1973 |
| JP | 4159191 | 6/1992 |
| JP | H8508557 | 9/1996 |
| JP | 2005248738 | 9/2005 |
| WO | 9423198 | 10/1994 |
| WO | 9629515 | 9/1996 |
| WO | 2004025122 | 3/2004 |
| WO | 2011104543 | 9/2011 |
| WO | 2011104546 | 9/2011 |
| WO | 2011147996 | 12/2011 |
| WO | 2011147997 | 12/2011 |
| WO | 2012060685 | 5/2012 |

OTHER PUBLICATIONS

Rampen, Almond, Taylor, Ehsan and Salter "Progress on the Development of the Wedding-cake Digital Hydraulic Pump/Motor", 2nd European Wave Power Conference, Lisbon, Nov. 8-10, 1995.

Salter, "Proposal for a Large, Vertical-Axis Tidal-Stream Generator with Ring-Cam Hydraulics" Third European Wave Energy Conference, Sep. 30-Oct. 2, 1998, Patras, Greece.

\* cited by examiner

RING CAM AND FLUID-WORKING MACHINE INCLUDING RING CAM

RELATED APPLICATIONS

The present application is a National Phase of International Application Number PCT/GB2011/051366, filed Jul. 19, 2011 and claims priority from, British Application Number 1013776.8, filed Aug. 17, 2010.

FIELD OF THE INVENTION

The invention relates to a ring cam for a fluid-working machine. The invention is of especial relevance in applications where ring cams are subjected to particularly large forces in use, and in particular to ring cams for large fluid-working machines, for example for use in the nacelle of a wind turbine.

BACKGROUND TO THE INVENTION

Fluid-working machines include fluid-driven and/or fluid-driving machines, such as pumps, motors, and machines which can function as either a pump or as a motor in different operating modes.

When a fluid-working machine operates as a pump, a low pressure manifold typically acts as a net source of a working fluid and a high pressure manifold typically acts as a net sink for a working fluid. When a fluid-working machine operates as a motor, a high pressure manifold typically acts as a net source of a working fluid and a low pressure manifold typically acts as a net sink for a working fluid. Within this description and the appended claims, the terms "high pressure" and "low pressure" are relative, and depend on the particular application. In some embodiments, low pressure working fluid may be at a pressure higher than atmospheric pressure, and may be several times atmospheric pressure. However, in all cases, low pressure working fluid will be at a lower pressure than high pressure working fluid. A fluid-working machine may have more than one low pressure manifold and more than one high pressure manifold.

Large displacement ring cam fluid-working machines (i.e. fluid-working machines having a large rotating annular cam driving a plurality of radial pistons arranged around the cam, with each piston typically reciprocating multiple times per cam revolution) are known and are proposed for use in renewable energy applications in which there is a low speed rotating input but a relatively high speed electrical generator (Rampen, Taylor & Riddoch, Gearless transmissions for wind turbines, DEWEK, Bremen, December 2006). Ring cam fluid-working machines typically have a plurality of rollers rolling on a wave shaped cam and operatively connected to pistons. Each piston is slideably engaged in a cylinder, the cylinder and piston together defining a working chamber containing working fluid, in communication via one or more valves with high and low pressure manifolds. The pistons are each operable to undergo reciprocating motion within the cylinder so as to vary the working chamber volume, when the ring cam rotates, such that a cycle of working chamber volume is executed, and during which working fluid may be displaced.

Ring cam fluid-working machines may be configured so that the pistons and cylinders are located inside the ring cam, the ring cam having an inward facing working surface, or may be configured so that the ring cam has an outward facing working surface and is located inside the pistons and cylinders. Indeed, ring cam fluid-working machines of either configuration are also known in which either the ring cam rotates, or the pistons and cylinders rotate. It is also possible for the ring cam to have both inward and outward facing working surfaces where the ring cam is located between inner and outer rings of pistons and cylinders. It is even possible for the pistons and cylinders to be aligned roughly parallel with the axis of rotation, and for the ring cam to have one or more axially facing working surfaces.

Ring cam pumps driving relatively small hydraulic motors have been proposed as robust variable speed transmissions, for example, for use in wind turbine generators, or tidal stream and gravity-fed hydroelectric generators.

Multi-cylinder fluid-working machines, including ring cam fluid-working machines, may be variable displacement fluid-working machines (either pumps or motors, or machines operable as either pumps or motors), wherein each working chamber is selectable to execute an active (or part-active) cycle of working chamber volume in which there is a net displacement of working fluid, or an idle cycle in which there is substantially no net displacement of working fluid, by the working chamber during a cycle of working chamber volume, for regulating the time-averaged net displacement of fluid from the low pressure manifold to the high pressure manifold or vice versa.

Large ring cam machines are difficult and expensive to repair, requiring disassembly of the whole body to repair even one working chamber. This may be particularly expensive in renewable energy applications because a heavy fluid-working machine must be moved from an inaccessible location (for example the nacelle of a wind turbine) requiring concomitantly large and costly transportation equipment (e.g. a crane). It is therefore desirable for such large scale fluid-working machines to be repairable in situ, so as to reduce or obviate the requirement for transportation of large components.

Furthermore, large fluid-working machines (such as those suitable for renewable energy generation) are typically subject to particularly high internal forces and pressures. For example, the pressure of the high (and indeed low pressure) working fluid of a large scale ring cam fluid-working machine, of a size suitable for a wind turbine, is particularly high. Consequently the forces received by the ring cam from the rollers are also high, and it is known for the ring cam working surfaces to degrade. It has been proposed to assemble large scale ring cams from a number of segments, and it is known for excessive wear to occur to the roller and to the working surface due to discontinuities which appear on the working surface under pressure of a roller at the interface between segments. Additionally, the weight of the rotating parts themselves may lead to excessive ring cam wear.

Accordingly, there remains a need for a fluid-working machine and a ring cam of modular construction for a radial fluid-working machine, of minimum weight and having extended working lifetime.

SUMMARY OF THE INVENTION

The terms "leading" or "trailing" edge (or end or other feature) of a part of a ring cam, or segment thereof, are expressed herein in relation to the direction of rotation of the ring cam in relation to the pistons, typically due to rotation of the ring cam but in some embodiments due to rotation of a housing on which the pistons are mounted. In some embodiments, the relative rotation of the ring cam and the pistons may be in either sense (for example the sense of rotation of a given fluid working machine may be reversed at certain times during operation or maintenance) and the leading and trailing edges or other features are defined in relation to one of the senses of rotation. Reference to reciprocating motion of at least one piston being coupled to rotation of the ring cam relative to the at least one piston include the possibilities that either the ring cam rotates, or the at least one piston rotates, or both rotate but at unequal rates. In all cases rotation is about an axis through the centre of the ring cam.

According to a first aspect of the invention there is provided a fluid working machine comprising: a ring cam, having a working surface, and at least one piston, at least one respective cam engaging element and at least one respective working chamber, and wherein the ring cam comprises at least two segments; each said segment having a leading cooperating formation at a leading region, and a trailing cooperating formation at a trailing region; each leading cooperating formation in cooperative engagement with a said trailing cooperating formation at an interlocking region; each said segment having a piston facing surface, the (typically, multi-lobe) cam working surface being that portion of the piston facing surfaces which operatively engages with the at least one piston by way of said at least one respective cam engaging element (such as a part of the piston, e.g. a piston shoe, or more typically a roller) so as to couple reciprocating motion of the at least one piston to rotation of the ring cam relative to the at least one piston; each said leading and trailing cooperating formation having a portion of the piston facing surface;
wherein across each interlocking region, the piston facing surface at the leading cooperating formation forms part of the working surface at a trailing region of the leading cooperating formation and is recessed from the working surface at the leading region of the leading cooperating formation, and the piston facing surface at the trailing cooperating formation forms part of the working surface at a leading region of the trailing cooperating formation and is recessed from the working surface at the trailing region of the trailing cooperating formation.

The invention also extends in a second aspect to a piston fluid-working machine comprising a ring cam according to the first aspect of the action, and at least one piston (typically a plurality of pistons) operatively engaging with the ring cam working surface such that reciprocating motion of the at least one piston is coupled to rotation of the ring cam relative to the at least one piston.

The invention also extends in a third aspect to a method of operating a fluid-working machine having a ring cam according to the first aspect, and at least one piston coupled to the ring cam by way of a cam engaging element, the method comprising causing relative rotation of the ring cam and the at least one piston such that the at least one cam engaging element passes smoothly from the leading cooperating formation of a first segment to the trailing cooperating formation of a second segment.

Typically, the or each piston operatively engages with the ring cam by way of a cam engaging element, which is typically a roller.

In known segmented ring cams, the working surface of one ring cam segment is intended to be aligned with and contact the working surface of an adjacent ring cam segment, such that the rollers, or other cam engaging elements, move smoothly between the ring cam segments. However, in practice, there will often be significant mismatches between adjacent working surfaces. Mismatches may be present on installation, or develop through wear, or be created transiently consequent to forces within the fluid working machine in use (for example resulting from the rollers, or other cam engaging elements, applying force to the cams). Thus, there will be discontinuities leading not only to noise, but to wear on the rollers, or other cam engaging elements, or on the edges of the working surfaces of the ring cam segments.

However, in the ring cam of the present invention, adjacent segments have interlocking cooperating formations, each of which has a piston facing surface which forms part of the working surface at one end, and is recessed from the working surface at the other end. There will be a location within the interlocking zone where a cam engaging element would contact both cooperating formations simultaneously. Thus, a roller (in rolling engagement with the ring cam), or other cam engaging element, will be handed over smoothly from one segment to the next segment, by contacting the working surface of the leading cooperating formation of the first segment, and then simultaneously contacting the working surface of the leading cooperating formation of the first segment and the trailing cooperating formation of the second segment, and then contacting only the working surface of the second segment. If there are any small mismatches in the alignment of the adjacent segments, this process will happen a little sooner or earlier. Furthermore, the exact position of this location may depend on manufacturing tolerances and wear.

However, there should not be a discontinuity such as would be found with slightly mismatched parallel working surfaces. Thus, smooth handover, minimising wear, can be accomplished despite manufacturing tolerances and wear in use. The cooperating formations are typically recessed from the working surface gradually along their length.

Typically the piston facing surface at the leading region of the leading cooperating formation, and the piston facing surface at the trailing region of the trailing cooperating formation, are recessed from the working surface by at least 0.25 mm, 0.5 mm or 1 mm in at least part of the interlocking region.

Typically, each cooperating formation comprises a tongue. Typically, each leading cooperating formation comprises a leading tongue, having a piston facing surface which forms part of the working surface at a trailing edge of the leading tongue, and which is recessed from the working surface at the leading region of the leading tongue, across the interlocking region. Typically also, each trailing cooperating formation comprises a trailing tongue, having a piston facing surface which forms part of the working surface at a leading edge of the trailing tongue, and which is recessed from the working surface at the trailing region of the trailing tongue, across the interlocking region. A cooperating formation may have a plurality of tongues. A cooperating formation may comprise first and second tongues defining a groove therebetween.

By the interlocking region, we refer to a region where cooperating formations (e.g. tongues) are adjacent each other, orthogonal to the direction in which rollers, or other cam engaging elements, move along the working surface in use. Thus, the cam engaging elements will extend over both cooperating formations in the interlocking region for a period of time as they are handed over from one segment to the next adjacent segment.

Typically, a plurality of pistons are arranged either outside the ring cam (for an outward facing ring cam), or inside the ring (for an inward facing ring cam), or, in some embodiments both (for a ring cam having both inward facing and outward facing working surfaces). Thus, the fluid-working machine is typically a radial piston fluid-working machine. However, a plurality of pistons may be arranged generally parallel to the axis of rotation of the ring cam. The plurality of pistons are typically radially arranged around the ring cam, and usually equally spaced.

Preferably, each piston is associated with a working chamber of volume which varies cyclically with reciprocating movement of the piston. Preferably, each piston is slidably mounted within a cylinder, such that a working chamber is defined between the cylinder and piston. Typically, the fluid-working machine comprises a body and the or each cylinder may be formed in the body. For example, the body may comprise or consist of a cylinder block. In some embodiments, the or each cylinder, or the or each piston, may be articulated (typically via a spherical bearing). The or each piston may be restrained within the body.

The volume of the working chamber varies cyclically with rotation of the ring cam. The fluid-working machine comprises a low pressure manifold and a high-pressure manifold, and a plurality of valves for regulating the flow of fluid between each working chamber and the low pressure and high-pressure manifold. Typically, at least one said valve associated with each working chamber is an electronically controlled valve. The fluid-working machine comprises a controller operable to control one or more said electronically controlled valves, on each cycle of working chamber volume and in phased relation to cycles working chamber volume, to select the net volume of working fluid displaced by each working chamber on each volume cycle.

Typically, each roller, or other cam engaging element, is biased against the ring cam working surface. For example, each roller, or other cam engaging element, may be biased against the working surface by an elastic member, such as a spring. Typically the elastic member biases each piston against each roller, or other cam engaging element, thereby biasing said roller (or other cam engaging element) against the working surface. Alternatively, or in addition, each roller (or other cam engaging element) and/or each piston, is biased against the working surface by fluid pressure from within the respective working chamber, throughout a part or all of a cycle of working chamber volume. Typically, fluid from within the respective working chamber is also in direct communication with each roller, or other cam engaging element, thereby to bias said roller, or other cam engaging element, against the working surface, and further to separate the roller, or other cam engaging element, from the piston. For example, each said piston may define a passageway extending from the working chamber and into fluid communication with the roller and the adjacent surface of the piston, so that high pressure fluid pools between the piston and the roller, and functions as a self-balancing fluid bearing.

In practice, the force exerted on each roller, or other cam engaging element, can be substantial. This force varies periodically during cycles of working chamber volume (and in some embodiments depends on the volume of fluid to be displaced by the working chamber on a particular cycle of working chamber volume selected by the controller). In order to reduce wear, it may be that the machine is configured, or operable, such that the rollers, or other cam engaging elements, bear on the interlocking regions when the respective working chamber is in direct fluid communication with the low pressure manifold and/or isolated from the high pressure manifold.

The fluid-working machine may be configured (or operable) such that the rollers, or other cam engaging elements, do not bear on the interlocking regions when the respective working chamber is contracting (for example in embodiments where the fluid-working machine is a pump). The fluid working machine may be configured (or operable) such that the rollers, or other cam engaging elements, do not bear on the interlocking regions when the respective working chamber is expanding (for example, in embodiments where the fluid-working machine is a motor). The fluid-working machine may be configured such that, when rotation is in a first direction, the rollers, or other cam engaging elements, do not bear on the interlocking regions when the respective working chamber is contracting, and when rotation is in a second direction, the rollers, or other cam engaging elements, do not bear on the interlocking regions when the respective working chamber is expanding (for example, in embodiments where the fluid-working machine is a pump/motor operable as a pump in a first direction of rotation and as a motor in a second direction of rotation).

In some embodiments the roller, or other cam engaging element, of a working chamber does not bear on an interlocking region every cycle (for example, the roller or other cam engaging element may bear on an interlocking region during only every second or only every third cycle, or only every more than two, or three or more cycles) of working chamber volume.

Accordingly, in embodiments wherein the fluid-working machine is operable as both a pump and a motor in a first direction of rotation, the fluid-working machine may be configured, or operable, such that in the first direction of rotation, each cam engaging element does not bear on an interlocking region when the respective working chamber is contracting, each said working chamber operable to execute a pumping cycle during every cycle of working chamber volume, and each said working chamber operable to execute a motoring cycle during cycles of working chamber volume in which the cam engaging element does not bear on an interlocking region (every second cycle, or every third cycle, or only every more than two, or three or more cycles, of working chamber volume, as the case may be.

In some embodiments, the fluid-working machine is operable as both a pump and a motor in a first direction of rotation and each cam engaging element does not bear on an interlocking region only when the respective working chamber is expanding, each said working chamber operable to execute a motoring cycle during every cycle of working chamber volume, and each said working chamber operable to execute a pumping cycle during cycles of working chamber volume in which the cam engaging element does not bear on an interlocking region.

The fluid-working machine may be operable as a motor in a first direction of rotation, and as a pump in a second direction of rotation, in the first direction of rotation each cam engaging element does not bear on an interlocking region when the respective working chamber is expanding, and in the second direction of rotation, each cam engaging element does not bear on an interlocking region when the respective working chamber is contracting.

Thus, when a roller or other cam engaging element bears on an interlocking region, the fluid pressure in the working chamber is limited, in comparison to the fluid pressure in the working chamber when the cam engaging element bears upon another region of the working surface (i.e. another region of the working surface not comprising an interlocking region or other discontinuity).

The fluid-working machine may be configured (or operable) such that the rollers, or other cam engaging elements, bear on the interlocking regions only when the respective working chamber is expanding (for example in embodiments where the fluid-working machine is a pump). The fluid working machine may be configured such that the rollers, or other cam engaging elements, bear on the interlocking regions only when the respective working chamber is contracting (for example, in embodiments where the fluid-working machine is a motor).

Accordingly, in embodiments wherein the fluid-working machine is operable as both a pump and a motor in a first direction of rotation, the fluid-working machine may be configured, or operable, such that in the first direction of rotation, each cam engaging element bears on an interlocking region only when the respective working chamber is expanding, each said working chamber operable to execute a pumping cycle during every cycle of working chamber volume, and each said working chamber operable to execute a motoring cycle during cycles of working chamber volume in which the cam engaging element does not bear on an interlocking region (every second cycle, or every third cycle, or only every more than two, or three or more cycles, of working chamber volume, as the case may be.

In some embodiments, the fluid-working machine is operable as both a pump and a motor in a first direction of rotation and each cam engaging element bears on an interlocking region only when the respective working chamber is contracting, each said working chamber operable to execute a motoring cycle during every cycle of working chamber volume, and each said working chamber operable to execute a pumping cycle during cycles of working chamber volume in which the cam engaging element does not bear on an interlocking region.

The fluid-working machine may be operable as a motor in a first direction of rotation, and as a pump in a second direction of rotation, in the first direction of rotation each cam engaging element bearing on an interlocking region only when the respective working chamber is contracting, and in the second direction of rotation, each cam engaging element bearing on an interlocking region only when the respective working chamber is expanding.

Thus, when a roller or other cam engaging element bears on an interlocking region, the fluid pressure in the working chamber is limited, in comparison to the fluid pressure in the working chamber when the cam engaging element bears upon another region of the working surface (i.e. another region of the working surface not comprising an interlocking region or other discontinuity).

Fluid-working machines may be operable to function as a pump or a motor (in one or both directions of rotation). Fluid-working machines (for example wind turbines) may function for the substantial majority of time as a pump, but also be operable as a motor, so as to enable the turbine blades (or other rotating apparatus) to be driven to a desired orientation during maintenance. It may be advantageous in some applications for a fluid-working machine to be operable as both a pump and a motor in a given direction of rotation. For example, fluid-working machines (such as wind turbines) which function as a pump for the majority of the time (and the or each cam engaging element does not bear on an interlocking region when the working chamber is contracting) may thus advantageously be operable on only some cycles of working chamber volume (i.e. when the or each cam engaging element does not bear on an interlocking region) as a motor so as to position the machine. For example, fluid-working machines (such as wind turbines) which function as a pump for the majority of the time (and the or each cam engaging element does not bear on an interlocking region when the working chamber is contracting) may thus advantageously be operable for a minority of the time as a motor (i.e. when the or each cam engaging element bears on an interlocking region when the working chamber is expanding) so as to position the machine.

In some embodiments (for example wherein each said working chamber is selectable on a cycle by cycle basis to execute an active cycle or an idle cycle and/or selectable to execute a pumping cycle or a motoring cycle, or wherein the fluid-working machine is configured to conduct a sequence of active cycles and idle cycles, or pumping cycles and motoring cycles in respective first and second directions of rotation) the fluid-working machine is operable (or configured), to limit the working fluid pressure in the said working chamber (in comparison to the fluid pressure in the working chamber when the cam engaging element bears upon another region of the working surface) when the rollers, or other cam engaging elements, bear on an interlocking region (in comparison to the fluid pressure in the working chamber when the cam engaging element bears upon another region of the working surface). Preferably the fluid pressure is limited to a pressure substantially lower than the maximum pressure during a typical active cycle of working chamber volume. For example, the may be limited to less than 50 Bar, 100 Bar or 200 Bar. The pressure may be limited to less than 50%, or less than 25%, of the maximum rated operating pressure of the working chamber, or the maximum pressure during a typical active cycle of working chamber volume.

Preferably the pressure is limited when the rollers, or other cam engaging elements, bear on an interlocking region by the controller selecting the net volume of working fluid to be displaced by the said working chamber during a cycle of working chamber volume. The net volume of working fluid displaced by a working chamber during a cycle of working chamber volume may be selected in advance of the respective cycle of working chamber volume.

It may be that the net volume of fluid to be displaced by a said working chamber during a cycle of working chamber volume (i.e. an active, idle, motoring or pumping cycle), is selected or selectable responsive to the pressure in the high pressure manifold and/or the position of each said roller (or other cam engaging element) in relation to each said interlocking region, so as to limit the working fluid pressure in the said working chamber.

For example, the pressure in the high pressure manifold of a fluid working machine of a wind turbine may vary depending on wind speed.

In some embodiments, the controller is operable to control the (by opening, closing or prevention of the opening or closing) one or more electronically controlled valves (between a said working chamber and the high and/or low pressure manifolds) to select a volume of working fluid to be displaced, or to prevent displacement of working fluid, by a said working chamber during a cycle of working chamber volume, when the associated roller, or other cam engaging element, bears on an interlocking region, to thereby limit the working fluid pressure in the said working chamber when the roller, or other cam engaging element, bears on an interlocking region.

In some embodiments, each said working chamber is operable to execute a part active cycle, in which there is a net displacement of a volume of fluid which is less than the maximum volume of fluid that the working chamber is operable to displace. Accordingly, the controller may be operable to control the one or more electronically controlled valves to select a part active cycle of a said working chamber when the associated roller, or other cam engaging element, bears on an interlocking region, to thereby limit the working fluid pressure in the said working chamber during that portion of said cycle of working chamber volume when the roller, or other cam engaging element, bears on an interlocking region.

The working surface may comprise further discontinuities and the fluid-working machine may be operable to limit the working-fluid pressure in the said working chamber when the rollers, or other cam engaging elements, bear on a discontinuity.

Accordingly, the method may comprise selecting, on a cycle by cycle basis, one or more of an active pumping cycle and active motoring cycle or an idle cycle, of one or more of the said working chambers, so as to limit the pressure in one or more of working chambers, when a cam engaging element bears on an interlocking region (or other discontinuity in the working surface). The method may comprise causing the controller to select an active pumping cycle and active motoring cycle or an idle cycle, of one or more of the said working chambers.

It may be that the axis of movement of each piston is coplanar with the ring cam, but does not extend directly radially from a centre axis of the ring cam. Instead, the axis of movement of each piston is preferably canted, i.e. does not extend directly away from the centre axis of the ring cam. This reduces shearing forces acting on the pistons slidably mounted within cylinders.

Typically, the working surface of the ring cam is wavelike (defining at least one and typically a plurality of waves). The waves may be sinusoidal, although there is typically some departure from sinusoidal form. Some or all segments may have a piston facing surface defining a portion of wave. In some embodiments, one or more of the or each said segment comprises a piston facing surface defining more than one wave, or a plurality of waves. Thus, the roller, or other cam engaging element, of a working chamber does not bear on an interlocking region every cycle of working chamber volume and may bear on an interlocking region only every more than one cycle of working chamber volume (which may be an integer or non-integer number cycles of working chamber volume). The roller, or other cam engaging element, of a working chamber may bear on an interlocking region only every two (or more than two) cycles of working chamber volume. Thus some or all segments may comprise more than one crest of the wavelike surface. Some or all segments may comprise more than one trough of the wavelike surface. The segments forming a ring cam may all be the same as each other, or there may be two or more shapes of segment forming the ring cam.

The ring cam may be mounted on a rotatable shaft. The rotatable shaft may be hollow. It may be that the ring cam rotates and the at least one piston remain in place. It may be that the ring cam is stationary and the least one piston rotates relative to the ring cam. It may be that, both the ring cam and the at least one piston may rotate, but with different rates or directions of rotation, such that there is relative rotation between the ring cam and the at least one piston.

Preferably, the most leading tip of the leading cooperating formation of a segment, or the most trailing region of the trailing cooperating formation of a segment, are smooth. By avoiding sharp edges, wear can be reduced.

Preferably, some or all segments comprise a slip-resisting formation, to resist slip of the segment relative to a cam segment support. For example, one or more segments may comprise a spline or groove to fit into a cooperating groove or spline of a cam segment support, or a groove to receive a keying member which also fits into a groove on a cam segment support. Preferably the cam segment support comprises the rotatable shaft.

Preferably, the piston facing surfaces of the cooperating formations of adjacent segments which engage in an interlocking region, cross at an angle of less than 180.0° (but typically greater than 170.0°).

Thus, the invention extends in a fourth aspect to a ring cam for a fluid-working machine having at least one piston, the ring cam comprising at least two segments; each said segment having a leading cooperating formation at a leading region, and a trailing cooperating formation at a trailing region; each leading cooperating formation in cooperative engagement with a said trailing cooperating formation at an interlocking region; each said segment having a piston facing surface, the piston facing surfaces together defining a (typically, multi-lobe) cam working surface for operative engagement with the at least one piston (typically by way of a cam engaging element, such as a roller) so as to couple reciprocating motion of the at least one piston to rotation of the ring cam or the at least one piston relative to the other; characterised in that the piston facing surfaces of the cooperating formations of adjacent segments which engage in an interlocking region cross at an angle of less than 180.0° (but typically greater than 170.0°).

Because the piston facing surfaces of cooperating formations of adjacent segments which engage in an interlocking region cross at an angle of less than 180.0°, a roller, mounted to a piston, rolling from one segment to an adjacent segment, will briefly have a point of contact with the working surface of each of the two adjacent segments, thereby transferring force gradually from one segment to the next segment. Even if there is a slight mismatch between the piston facing surfaces of adjacent pistons, a roller may still pass over the resulting discontinuity if it is small relative to the curvature of the ring cam and the said angle.

By crossing at an angle, we refer to the angle at which a plane which is coplanar with the piston facing surface of a cooperating formation at an interlocking region and a plane which is coplanar with the piston facing surface of an adjacent cooperating formation intersect.

The invention also extends in a fifth aspect to a fluid-working machine comprising a ring cam according to the fourth aspect of the invention, and at least one piston (typically a plurality of pistons), the at least one piston coupled to a roller, the at least one roller in rolling engagement with the ring cam working surface such that reciprocating motion of the at least one piston is coupled to rotation of the ring cam relative to the at least one piston.

The invention extends in a sixth aspect to a ring cam for a fluid-working machine having at least one piston, the ring cam comprising at least two segments; said segments having a piston facing surface, the piston facing surfaces together defining a (typically multi-lobe) cam working surface for operative engagement with the at least one piston by way of a cam engaging element (such as a part of the piston, e.g. a piston shoe, or more typically a roller) so as to couple reciprocating motion of the at least one piston to rotation of the ring cam relative to the at least one piston characterised in that the piston facing surface of each segment is held in compression.

Thus, when forces from the pistons (coupled through cam engaging elements such as rollers or piston shoes) bear on the piston facing surface of each segment, the resulting tensile stress is partially or fully cancelled out by the compression of the piston facing surface of the segment, reducing or avoiding tensile stresses which could otherwise reduce the working life of the segment. The segment is typically made from metal, such as steel, which is stronger in compression than in tension.

Preferably the piston facing surface is held in tangential (also known as hoop) compression. By tangential compression is meant that the piston facing surface of each segment is compressed in the direction tangential to (and around) the piston facing surface. Preferably the compression of the piston facing surface is greater than 50 MPa, 100 MPa or 200 MPa, in the direction tangential to the piston facing surface.

In practice, as well as the piston facing surface of each segment, at least a region adjacent the surface of each segment will be held in compression. Typically, a compressed region extends into the segment from the piston facing surface, wherein the tangential compression is preferably greater than 50 MPa, 100 MPa or 200 MPa. For example, tangentially compressive forces may be present in the segment to a depth of greater than 1 mm, 2 mm or 5 mm from the piston facing surface.

By being held in compression, we refer to there being compressive strain in the absence of other forces, such as forces from a piston. Thus, the segments are elastically deformed. Typically, the or each segment would adopt a different shape were it not held in compression. Thus, the segment is typically retained such that at least the piston facing surface is held in compression, and typically tangential compression, by one or more fixtures. The one or more fixtures may be releasable, to enable the segments to be removed. For example, the segments may be individually removable to enable them to be tested, maintained or replaced.

Typically each said segment has an inherent curvature which the segment would adopt without external forces and each said segment is held with a different curvature, thereby holding the piston facing surface of each segment in compression, and typically tangential compression. By the inherent curvature we refer to the curvature which the segment would adopt if there were no external forces acting on it, such as forces arising from pistons or from the segment being held under elastic deformation by one or more fixtures.

Typically, the ring cam comprises a cam segment support, such as a drum, and each segment is fixed to the cam segment support by one or more fixtures. Typically, each segment has a support facing surface opposite the piston facing surface.

It may be that each segment comprises one or more through bores extending between the support facing surface and piston facing surface for receiving one or more fixtures, such as bolts, to retain the segment on the cam segment support, with the piston facing surface under compression. Thus, the piston facing surface of each segment is typically perforated by the through bores. Each segment may comprise indentations in the side of the segment, extending from the piston facing surface to the one or more fixtures.

The ring cam may have an outward facing working surface for operative engagement with pistons radially outward of the ring cam, wherein each said segment is retained with a lesser curvature than its inherent curvature. Thus, the cam segment support may define a first radius of curvature and each segment may have an inherent curvature with a second radius of curvature, wherein the first radius of curvature is greater than the second radius of curvature. The first radius of curvature may be defined by the configuration of segment retaining formations (such as bolt holes) on the cam segment support (which need not extend continuously between the segment retaining formations). Each segment may be retained, with the piston facing surface in compression, by one or more bolts extending through said through bores to the cam segment support. Preferably the first radius of curvature is at least 0.05% or 0.1% greater than the second radius of curvature and the first radius of curvature may be between 0.1% and 0.5%, or in some embodiments between 0.2% and 0.3%, greater than the second radius of curvature.

The ring cam may have an inward facing working surface for operative engagement with pistons radially inward of the ring cam, wherein each said segment is retained with a greater curvature than its inherent curvature. Thus, the cam segment support may define a first radius of curvature and each segment may have an inherent curvature with a second radius of curvature, wherein the first radius of curvature is less than the second radius of curvature. The first radius of curvature may be defined by the configuration of segment retaining formations (such as bolt holes) on the cam segment support which need not extend continuously between the segment retaining formations. Each segment may be retained, with the piston facing surface in compression, by one or more bolts extending through said through bores (or indentations) to the cam segment support. Preferably the first radius of curvature is at least 0.1% or 0.5% less than the second radius of curvature and the first radius of curvature may be between 0.1% and 0.5%, or in some embodiments between 0.2% and 0.3%, greater than the second radius of curvature.

Each said segment may comprise one or more compressible zones beneath the piston facing surface (closer, and typically much closer, to the piston facing surface than the support engaging surface), the compressible zones comprising a medium having greater compressibility than the surrounding material of the segment.

The zones may extend partially or entirely across the segment (for example, substantially parallel to the axis of rotation of the ring cam). The compressible zones may be holes or voids in the material of said segments, for example through-bores extending between opposite sides of the segment. The compressible zones may comprise any other suitable compressible medium.

Each said segment may comprise a plurality of compressible zones.

Compressible zones advantageously facilitate the generation of compression in the said piston facing surfaces. The compressible zones may enable the generation of greater tangential compression for a given amount of force exerted by the fixtures.

The invention extends in an seventh aspect to a fluid-working machine comprising a ring cam according to the sixth aspect of the invention, and at least one piston (typically a plurality of pistons) operatively engaging with the ring cam working surface by way of a cam engaging element (such as a part of the piston or e.g. a roller) such that reciprocating motion of the at least one piston is coupled to rotation of the ring cam relative to the at least one piston.

In an eighth aspect, the invention extends to a method of fitting a ring cam segment to form a ring cam according to the sixth aspect, the method comprising the step of mounting a ring cam segment so that the piston facing surface of the ring cam segment forms part of the said working surface while concomitantly elastically deforming the ring cam segment to compress the piston facing surface of the segment.

The cam segment support may extend continuously between at least two said fixtures and typically between each said fixture, and preferably the step of mounting a ring cam segment comprises bringing the support facing surface of the segment into engagement with the cam segment support at or near to the leading and trailing ends of the segment, such that there is a gap between the support facing surface and the support extending at least part way between the leading and trailing ends of the segment (typically across the centre of the segment) and elastically deforming the segment to reduce (and preferably, eliminate) the gap. The segment may be elastically deformed when bolts connecting the segment to the cam segment support are tensioned.

According to a ninth aspect of the invention there is provided a ring cam segment having a working surface portion for operative engagement with a piston by way of a cam engaging element (such as a part of the piston, e.g. a piston shoe, or more typically a roller), the working surface portion describing a proportion, x, of a repeating wave (which may be generally sinusoidal), the segment having a curvature, the segment underlying the working surface portion curving by a fraction, y, of 360°, wherein x is not an integral multiple of y.

Typically, the ring cam segment requires to be flexed by an amount which is at least 0.01° to be fitted into a ring cam (that is to say, the relative orientation of the leading and trailing ends required to be changed by an amount which is at least 0.01°). The ring cam segment may be required to be flexed by an amount which is at least 0.1°. In one embodiment it is required to be flexed by 0.05°. Typically, the ring cam segment requires to be flexed by between 0.05% and 0.1% (that is to say that the radius of curvature of the segment requires to be changed by between 0.05% and 0.1%).

Thus, each segment has a working surface portion which describes a proportion (which may be greater than, or less than, or equal to unity) of a repeating wave. However, the curvature of the segment, underlying the working surface portion, is not such that a plurality of the segments could be fitted together to form a ring cam having a continuous working surface comprising an integer number of waves without the segments being flexed and thereby elastically deformed. The segments are configured so that to form a ring cam having a continuous working surface comprising an integer number of waves, the segments must be flexed in the appropriate sense such that the working surface portions of the segments are held in compression.

According to a tenth aspect of the invention there is provided a fluid-working machine comprising a ring cam, a low pressure manifold, a high pressure manifold, at least one piston defining a working chamber, and at least one valve (which may be an electronically controlled valve, typically an electronically controlled face sealing poppet valve) associated with the or each working chamber for connecting the working chamber alternately to the low or the high pressure manifold in phased relationship to cycles of working chamber volume, the ring cam having a wave-like cam working surface for operative engagement with the at least one piston by way of a cam engaging element (such as a part of the piston, e.g. a piston shoe, or more typically a roller) so as to couple reciprocating motion of the at least one piston to rotation of the ring cam relative to the at least one piston and to thereby define the cycles of working chamber volume; the waves of the wave-like cam surface each having a leading face and a trailing face; characterised by discontinuities in the working surface located on (and typically only on) whichever of the leading face and the trailing face the at least one piston exerts does least work during normal operation resulting from the flow of fluid into and out of the working chamber in phased relationship to cycles of working chamber volume.

The said piston may do least work on one or other of the leading or trailing face during each said cycle of working chamber volume. For example, the pressure within a working chamber during each said cycle of working chamber volume typically varies cyclically and is at a maximum when the respective cam following element is bearing on one of the leading and trailing faces (such that the force exerted on the working surface is at a maximum and most work is done on the said faces), and is at a minimum when the cam following element is bearing on the other of the leading and trailing faces (such that the force exerted on the working surface is at a minimum and least work is done on the said faces).

The said piston may do least work on one or other of the leading or trailing face during the operating-lifetime of the fluid working machine, or of the ring cam. Least work may be done on one or other of the leading or trailing face over any given time period. For example, a fluid-working machine may have more than one operating mode and may have a first operating mode (which may be in a first direction of rotation) in which more work is done on one of the leading or trailing face during each said cycle of working chamber volume (or the majority of cycles) and a second operating mode (which may be in a second direction of motion) in which more work is done on the other of the leading or trailing face during each said cycle (or the majority of cycles) of working chamber volume, wherein the fluid-working machine functions in the first mode for the majority of the time (for example during normal operation) and the second mode for the minority of the time (for example, during maintenance), the said discontinuities located on (and typically only on) whichever of the leading face and the trailing face the at least one piston exerts does least work during the first mode of operation.

Typically, the ring cam comprises at least two segments extending around the circumference of the ring cam; and a support structure to which the said segments are attached; each said segment comprising a piston facing surface, the piston facing surfaces of the segments defining the working surface.

The said discontinuities in the working surface may be attachment means for securing said segments to the support structure. The attachment means may, for example, be one or more fixtures, such as bolts, extending through the working surface (typically, through a part of a segment piston facing surface which defines the working surface of the ring cam). The attachment means may comprise apertures through the said segments and/or recesses for receiving bolts.

The said discontinuities may be discontinuities between adjacent segments. It may be that the plurality of segments each comprising leading and trailing cooperating formations and the discontinuities in the working surface comprise interlocking regions where the leading and trailing cooperating formations of adjacent segments overlap across the respective interlocking region.

Wear on the ring cam working surface and the cam engaging elements increases with received force, and is greatest in regions of the working surface having a discontinuity (such as interlocking regions between ring cam segments, or attachment means for securing segments to a support structure). Therefore, the fluid-working machine of the invention, wherein force received in the regions of the working surface of the ring cam having discontinuities over time (i.e. work done on the said regions averaged over time and, in some embodiments, during each said cycle of working chamber volume) is lower in comparison to other regions. Thus, the rate of wear of the working surface and cam engaging elements is reduced.

Typically, the said discontinuities are located only on the said whichever of the leading face and the trailing face the pistons do least work during normal operation, (or do least work averaged over time, such as the operating lifetime of the fluid-working machine or the ring cam) resulting from the flow of fluid into and out of the working chamber in phased relationship to cycles of working chamber volume.

It may be that the said discontinuities are of a first type (e.g. attachment means, or said interlocking regions) and that the working surface comprises further discontinuities, of a second type, which are otherwise distributed, for example, within troughs between adjacent waves, or on both leading and trailing faces.

Typically, the fluid-working machine comprises a plurality of pistons arranged radially around the ring cam.

Each said cam engaging element may be biased against the working surface by fluid pressure from within the respective working chamber (during a part of or, more typically, all of each cycle of working chamber volume). Thus force on each said piston resulting from the pressure of working fluid in the respective working chamber is transmitted to the working surface by the or each said cam engaging element and bears upon the working surface (thereby doing work on the working surface). Each said cam engaging element may alternatively or in addition be biased against the working surface by an elastic member, such as a spring.

The fluid-working machine may be operable to limit the pressure in a said working chamber when a respective cam engaging element bears on a said discontinuity (to thereby reduce the force exerted on the region of the working surface comprising the discontinuity, such that the work done on the region of the working surface comprising the discontinuity is also limited).

Preferably, the working chamber is sealed from the high pressure manifold when the cam engaging element bears on the said discontinuities, in order that the pressure is limited within the working chamber when the cam engaging element bears on a said discontinuity. For example, the working chamber may be sealed from the high pressure manifold by way of a valve (referred to herein as the high pressure valve), which is typically an electronically controlled valve (such as a face seating poppet valve, which may be an electronically controlled face sealing poppet valve). Alternatively, or in addition, the working chamber may be placed in fluid communication with the low pressure manifold when the cam engaging element bears on the said discontinuities, for example by way of a valve (such as a face seating poppet valve, which may be an electronically controlled face sealing poppet valve) in order that the pressure is limited within the working chamber when the cam engaging element bears on a said discontinuity.

Typically, a contraction stroke occurs when the cam engaging element bears upon the leading face of a wave and an expansion stroke occurs when the cam engaging element bears upon the trailing face.

It may be that the fluid-working machine is a pump and each said discontinuity is located in a trailing face. In a pump, fluid will typically be received from the low pressure manifold during an expansion stroke while the respective cam engaging element bears on the trailing face and so each discontinuity will coincide with a period of relatively low pressure in the working chamber.

It may be that the fluid-working machine is a motor and each said discontinuity is located in a leading face. In such a motor, fluid will typically be displaced to the low pressure manifold during a contraction stroke while the respective cam engaging element bears on the leading face and so each discontinuity will coincide with a period of relative low pressure in the working chamber.

It may be that the said discontinuities are located in the working surface of only some of whichever of the leading face and the trailing face the pistons do least work during operation resulting from the flow of fluid into and out of the working chamber in phased relationship to cycles of working chamber volume in a first operating mode.

It may be that the fluid-working machine has a second operating mode in which it executes whichever of active pumping or active motoring cycles of working chamber volume cause the pistons to do a greater amount of work on the said whichever of the leading face and the trailing face the pistons do least work during operation in the first operating mode, and in which said active pumping or active motoring cycles are carried out selectively when the cam engaging element bears on the said whichever of the leading face and the trailing face the pistons do least work during operation in the first operating mode do not have the said discontinuities.

The first operating mode may be pumping and the faces on which the pistons do least work (or exert least force) during operation in the first operating mode may be the trailing faces and the second operating mode may be motoring.

The first operating mode may be motoring and the faces on which the pistons do least work (or exert least force) during operation in the first operating mode may be the leading faces and the second operating mode may be pumping.

Each said working chamber may comprise one or more electronically controllable valves, and the fluid-working machine may comprise a controller, operable to control the or each electronically controllable valve. Each said working chamber may be selectable by the controller, on a cycle by cycle basis, to conduct an active cycle (where there is a net displacement of working fluid) or an idle cycle (where there is substantially no net displacement of fluid), by virtue of control of the or each electronically controllable valve. Similarly, each said working chamber may be selectable to conduct an active pumping cycle or an active motoring cycle, on a cycle by cycle basis. It may be that the controller executes a program stored on a computer readable storage medium in use and the program determines whether least force is exerted, or least work is done, in use on the leading or trailing faces.

Thus, the invention extends in an eleventh aspect to a ring cam for a fluid working machine, the ring cam comprising a working surface for operative engagement with at least one piston by way of a cam engaging element (such as a part of the piston, e.g. a piston shoe, or more typically a roller) so as to couple reciprocating motion of the or each piston to rotation of the ring cam relative to the or each piston and to thereby define the cycles of working chamber volume; the working surface comprising a plurality of waves having leading and trailing faces, wherein the working surface comprises discontinuities either in the leading faces or the trailing faces of the said plurality of waves.

By the leading and trailing faces we refer to the faces of each wave on which each cam engaging element first and last engages, in use of the ring cam in a fluid-working machine. It may be that the ring cam is intended for use in either of two orientations in which case whichever sense is considered leading or trailing is arbitrary.

Every wave of the working surface may comprise a said discontinuity, or the working surface may comprise discontinuities mutually spaced by more than one wave length (for example only every one and a half waves, or only every second, or only every third wave). The working surface may comprise one or more waves not having a discontinuity therein.

Typically, the ring cam comprises at least two segments extending around the circumference of the ring cam; and a support structure to which the said segments are attached; each said segment comprising a piston facing surface, the piston facing surfaces of the segments defining the working surface.

It may be that the said discontinuities are discontinuities within the piston facing surfaces of the segments (rather than discontinuities between segments). The said discontinuities in the working surface may be attachment means for securing said segments to the support structure. The attachment means may, for example, be one or more fixtures, such as bolts, extending through the working surface (typically, through a part of a segment piston facing surface which defines the working surface of the ring cam). The attachment means may comprise apertures through the said segments or recesses for receiving bolts.

However, it may be that the discontinuities are interfaces between adjacent segments. For example, it may be that each of the plurality of segments each comprising leading and trailing cooperating formations and the said discontinuities in the working surface comprise interlocking regions where the leading and trailing cooperating formations of adjacent segments overlap across the respective interlocking region.

Typically, the said discontinuities are located only on the said leading faces or only on the said trailing faces.

It may be that the said discontinuities are located only in some of the said leading or trailing faces. For example, in alternate leading or trailing faces, or every three or four leading or trailing faces, or in two out of every three, or three out of every four leading or trailing faces.

In some embodiments there is more than one discontinuity (for example one and a half, or two, or more than two) per wave (and therefore per cycle of working chamber volume).

The waves of the working surface may be sinusoidal.

According to a twelfth aspect of the invention, of the invention there is provided a method of operating a fluid-working machine, the fluid-working machine comprising a ring cam, a low pressure manifold, a high pressure manifold, at least one piston defining a working chamber, and at least one valve (which may be an electronically controlled valve, typically an electronically controlled face sealing poppet valve) associated with the or each working chamber for connecting the working chamber alternately to the low or the high pressure manifold in phased relationship to cycles of working chamber volume, the ring cam having a wave-like cam working surface for operative engagement with the at least one piston by way of a cam engaging element (such as a part of the piston, e.g. a piston shoe, or more typically a roller) so as to couple reciprocating motion of the at least one piston to rotation of the ring cam relative to the at least one piston and to thereby define the cycles of working chamber volume; the waves of the wave-like cam surface each having a leading face and a trailing face; the leading or trailing faces comprising discontinuities, the method characterised by the at least one piston doing least work during normal operation resulting from the flow of fluid into and out of the working chamber in phased relationship to cycles of working chamber volume on whichever of the leading face and the trailing face comprise the discontinuities.

It may be that only some of the said leading or trailing faces comprise said discontinuities.

According to a thirteenth aspect of the invention, there is provided a method of operating a fluid-working machine, the fluid-working machine comprising a ring cam, a low pressure manifold, a high pressure manifold, at least one piston defining a working chamber of cyclically varying volume, and at least one electronically controlled valve associated with the or each working chamber for connecting the working chamber alternately to a said low pressure manifold and a said high pressure manifold in phased relationship to cycles of working chamber volume; the ring cam having a working surface for operative engagement with the or each piston by way of a cam engaging element (such as a part of the piston, e.g. a piston shoe, or a roller) so as to couple reciprocating motion of the or each piston to rotation of the ring cam relative to the or each piston and to thereby define the cycles of working chamber volume; one or more regions of the working surface having a discontinuity;

the method characterised by limiting the working fluid pressure in a said working chamber when the respective cam engaging element (i.e. the cam engaging element through which the piston defining the said working chamber engages within the cam working surface) bears on a said discontinuity in the working surface.

Thus, the fluid pressure in the working chamber when the cam engaging element bears upon a discontinuity (and, in some embodiments, the leading face or trailing face in which the discontinuity is located) is typically less than the pressure in the working chamber when the cam engaging element bears upon another region of the working surface. Consequently, the work done by the said pistons on the working surface, and the wear of the working surface, in the region of a discontinuity is reduced.

The ring cam may be a ring cam according to the eleventh aspect of the invention.

It may be that the working fluid pressure in the said working chamber is limited by sealing the working chamber from the high pressure manifold when the cam engaging element passes over (i.e. bears on) the discontinuity, for example, by controlling the timing of opening or closing of a said electronically controlled valve regulating the flow of fluid between the working chamber and the high pressure manifold.

It may be that the ring comprises a plurality of waves having leading and trailing faces and the said discontinuities are located in one of the leading or the trailing faces and the working fluid pressure in the said working chamber is limited by synchronising active cycles of working chamber volume with rotation of the ring cam such that the point in each active cycle of working chamber volume where working chamber pressure is greatest occurs while the cam engaging element bears on the other of the leading or the trailing faces.

It may be that the ring cam comprises a plurality of waves having leading and trailing faces and the said discontinuities are located in only some of the said leading or only some of the said trailing faces (for example on alternate leading faces, or only every third leading face, or on alternate trailing faces, or only every third trailing face);

and the fluid-working machine has a first operating mode (e.g. pumping) in which the pressure in each working chamber exceeds a threshold when (and typically only when) the respective cam engaging element bears on the other of the said leading or the trailing faces (i.e. those in which the discontinuities are not located);

and (typically) the pressure in each working chamber does not exceed the threshold when the respective cam engaging element bears on each of the said discontinuities (or when the respective cam engaging element bears on the portion comprising a said discontinuity, or all of each of the said leading or trailing faces in which the discontinuities are located);

and a second operating mode (e.g. motoring, or a second pumping mode in which the ring cam rotates in the opposite direction to the first mode) in which the pressure in each working chamber does not exceed the threshold when the cam engaging element bears on the said discontinuities (or on the said leading or trailing faces in which the discontinuities are located).

It may be that working fluid pressure in the said working chamber is limited (for example in a second operating mode) by selecting the timing of active cycles of working chamber volume in the said operating modes so that the pressure does not exceed the threshold the majority, or preferably all, of the times when the cam engaging element bears on a said discontinuity (or, in some embodiments, on the said leading or trailing faces in which the discontinuities are located).

The threshold may be a pressure value, or may be a range of values. The threshold may be selected as a proportion of the pressure in the high pressure manifold, or as a proportion of the maximum rated operating pressure of the said working chambers, or the threshold may be empirically determined in relation to the physical properties of the ring cam. The threshold may be varied according to the operating requirements of the fluid working machine.

Typically, the net displacement of working fluid on each cycle of working chamber volume is determined by controlling the said one or more electronically controllable valves. Typically, on each cycle of working volume, a decision is made as to whether to carry out an active cycle in which a net displacement of working fluid is made (e.g. an active pumping cycle or an active motoring cycle) or an idle cycle in which no net displacement of fluid is made.

Preferably the fluid pressure within a working chamber is limited to a pressure substantially lower than the maximum pressure during a typical active cycle of working chamber volume when the respective cam engaging element bears on a said discontinuity. Accordingly, the threshold is typically substantially lower than the maximum pressure during a typical active cycle of working chamber volume. For example, the pressure may be limited to less than 50 Bar, 100 Bar or 200 Bar. The pressure may be limited to less than 50%, or less than 25%, of the maximum rated operating pressure of the working chamber, or the maximum pressure during a typical active cycle of working chamber volume.

Typically, the pressure within a working chamber during a cycle of working chamber volume varies cyclically and is at a maximum when the respective cam following element is bearing on one of the leading and trailing faces, and is at a minimum when the cam following element is bearing on the other of the leading and trailing faces. Accordingly, the working chamber typically executes an active cycle in which the pressure within the working chamber reaches a maximum when the respective cam engaging element bears on leading or trailing faces not having a discontinuity therein. In some embodiments, it may be that the working chamber is operable to execute an active cycle in which the pressure within the working chamber reaches a maximum while the respective cam engaging element bears on a leading or trailing face having a discontinuity (e.g. attachment means) therein only if a measured (or predicted) pressure, such as the pressure in the high pressure manifold measured by a pressure sensor, is below the threshold.

It may be that the net volume of fluid to be displaced by a said working chamber during a cycle of working chamber volume is selected or selectable responsive to the pressure in the high pressure manifold and/or the position of each said roller (or other cam engaging element) in relation to each said discontinuity (e.g. attachment means).

In some embodiments, the controller is operable to control (by opening, closing or prevention of the opening or closing) the one or more of the electronically controlled valves to select a volume of working fluid to be displaced, or to prevent displacement of working fluid, by a said working chamber during a cycle of working chamber volume, when the associated roller, or other cam engaging element, bears on a discontinuity, to thereby limit the working fluid pressure in the said working chamber.

It may be that the net volume of fluid to be displaced by a said working chamber during a cycle of working chamber volume is selected or selectable responsive to the pressure in the high pressure manifold and/or the position of the or each cam engaging element in relation to each said discontinuity, to thereby limit the working fluid pressure in the said working chamber.

In some embodiments, the controller is operable to control (by opening, closing or prevention of the opening or closing) the one or more of the electronically controlled valves to select a volume working fluid to be displaced, or to prevent displacement of working fluid by a said working during a cycle of working chamber volume, to thereby limit the working fluid pressure in the said working chamber, when the associated cam engaging element, bears on a discontinuity. Thus, each said working chamber may be selectable or selected, by the controller, on a cycle by cycle basis to execute an active cycle or an idle cycle, or a part active cycle, or a pumping cycle or a motoring cycle, so as to limit the pressure of working fluid in the said working chamber, when the cam engaging element bears on a discontinuity in the working surface.

The method may comprise reading discontinuity location data from a computer readable data storage medium (e.g. a memory) which stores data concerning the location of each said discontinuity in relation to the relative orientation of the ring cam. The method may comprise reading ring cam orientation data (e.g. from a sensor) and determining whether a cam engaging element associated with a working chamber will or will not pass over a discontinuity on the leading or trailing face of a wave of the ring cam surface during a particular cycle of working chamber responsive to that data.

According to a fourteenth aspect of the invention, there is provided a fluid-working machine comprising a ring cam, a low pressure manifold, a high pressure manifold, at least one piston defining a working chamber of cyclically varying volume, and at least one electronically controlled valve associated with the or each working chamber for connecting the working chamber alternately to a said low pressure manifold and a said high pressure manifold in phased relationship to cycles of working chamber volume; the ring cam having a working surface for operative engagement with the or each piston by way of a cam engaging element (such as a part of the piston, e.g. a piston shoe, or a roller) so as to couple reciprocating motion of the or each piston to rotation of the ring cam relative to the or each piston and to thereby define the cycles of working chamber volume; one or more regions of the working surface having a discontinuity; characterised by the machine being operable to limit the working fluid pressure in a said working chamber when the respective cam engaging element bears on a said discontinuity in the working surface.

Preferred and optional features described in relation to any of the first through fourteenth aspects of the invention correspond are preferred and optional features of any of the first through fourteenth aspects of the invention.

The invention also extends to a kit of parts which, when assembled, forms a ring cam according to the first aspect of the invention, or according to the fourth aspect of the invention, or according to the seventh aspect of the invention or according to the eleventh aspect of the invention, or a fluid-working machine according to the second aspect of the invention, or according to the fifth aspect of the invention, or according to the seventh aspect of the invention, or according to the tenth aspect of the invention, or according to the fourteenth aspect of the invention.

The invention also extends to a kit of parts comprising a cam segment support and a plurality of cam segments according to the ninth aspect of the invention, or disclosed in relation to any of the first through twelfth aspects, wherein the piston facing surfaces of the plurality of cam segments together form a ring cam working surface having an integral number of waves when elastically deformed and fitted to the cam segment support.

The invention also extends to a computer readable medium storing program code which when executed on a fluid working machine controller, causes the controller to carry out a method according to the twelfth or thirteenth aspect of the invention.

DESCRIPTION OF THE DRAWINGS

An example embodiment of the present invention will now be illustrated with reference to the following Figures in which.

DETAILED DESCRIPTION OF AN EXAMPLE EMBODIMENT

Figures 1A, 1B:
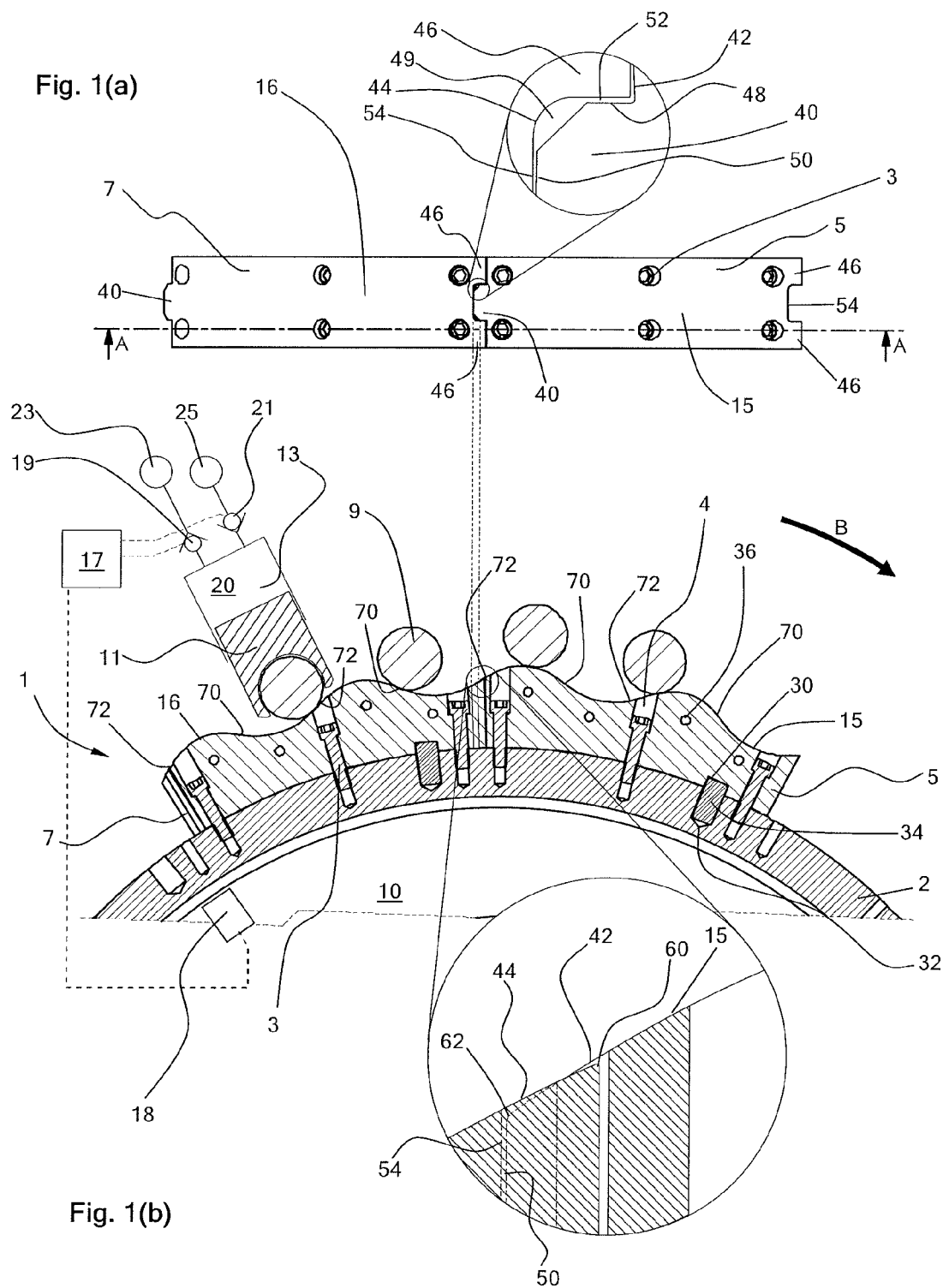
FIG. 1(a) is a plan view of a portion of a working surface of a ring cam of a wind turbine pump, defined by the piston facing surfaces of two cooperatively engaged cam segments.
FIG. 1(b) is an axial section along line A of a ring cam of a wind turbine pump, showing two cam segments secured to the turbine drive shaft, schematically depicting the position of axial piston rollers, and a working chamber, in relation to the working surface defined by the cam segments.

With reference to FIG. 1(b), a portion of a ring cam 1 is formed from cam segments 5 and 7, secured by bolts 3 which extend from apertures 4 in the surface of the cam segments and fix the cam segments to a cam support structure 2. A plurality of further cam segments (not shown) are securable to the cam support structure, to make up the complete ring cam. The cam support structure is coupled to drive shaft 10 (which rotates in direction B in normal use) through which torque is received from an energy source (e.g. the blades of a wind or tidal turbine).

Each cam segment has a piston facing surface 15, 16 which defines a portion of the working surface of the ring cam. Thus, the ring cam has a working surface defined by a plurality of cam segments secured around the circumference of the drive shaft. The working surface is wave-like and comprises a plurality of waves having leading surfaces 70 and trailing surfaces 72 (defined relative to the direction of rotation). The waves may be generally sinusoidal although this is not essential. The piston facing surfaces preferably have a heat and/or chemical treatment applied during manufacture to achieve the desired surface properties.

Notches in the segments 30 and shaft 32 mate with keys 34 that prevent the segments rotating around the shaft, acting as a slip preventing feature. Cross bolt holes 36 are for holding side plates (120, shown in FIG. 3) to the segments, which prevent the rollers 9 from sliding off the rolling surface. Alternatively, a convex or concave camber may be applied to the rollers and/or the piston facing surfaces to achieve the same outcome.

Each segment 5,7 has at one end a trailing tongue formation 40 (being an example of a trailing cooperating formation) and, at the other end, a groove formation 54 formed between two leading tongue formations 46 (together forming an example of a leading cooperating formation).

Leading segment 5 has a trailing edge 42 which interlocks with a leading edge 44 of groove formation 54 of the trailing segment 7. The tongue and groove formations in combination act as the interlocking region.

The faces of the tongue 48, 50 and groove 52, 54 formations may be perpendicular to the shaft as shown, or may be at another angle to the shaft. The tongue and groove formations may cooperate to fix the segments relative to each other by end faces 50, 54 and side faces 48, 52, which need not be parallel, together arranged so as to make the fit between tongue and groove formations tight or loose as desired. Tongue 40 has cut away leading edges leaving a gap 49 to improve the fit between the segments and avoid buckling. A number of other suitable formations will present themselves to those skilled in the art.

The piston facing surface of each segment extends continuously from the outer surface of the leading tongue formations to the outer surface of the trailing tongue formation. The piston facing surface of the leading tongue formations of the trailing segment 7 form part of the working surface at a trailing region of the leading tongue formations, but is gradually recessed along the length of the leading tongue formations, such that the piston facing surface 16 is recessed from the working surface at the leading end of the trailing segment. The piston facing surface of the trailing tongue formation of the leading segment 5 forms part of the working surface at a leading region, but is gradually recessed along the length of the trailing tongue formation, such that the piston facing surface 15 is recessed from the working surface at the trailing edge 50 of the leading segment. Thus, the piston facing surfaces of each segment predominantly forms parts of the working surface of the ring cam, however, there is also a part of the piston facing surface at each end of each segment which does not form part of the working surface of the ring cam (and which is recessed from the working surface of the ring cam).

Because the piston facing surface of the tongues is recessed towards the leading end of the leading cooperating formations of the trailing segment and the trailing end of the trailing cooperating formation of the leading segment, the piston facing surfaces of the leading segment and the trailing segments subtend an angle of close to but less than 180.0°, for example 178.0° at the interlocking region.

In order to form a fluid-working machine, pistons 11 are coupled to the ring cam by way of rollers 9 which bear on the working surface and roll along the working surface in use so as to reciprocate the pistons within cylinders 13. The pistons and cylinders together define working chambers 20 of cyclically varying volume and the volume cycles of the working chambers are defined by the wave-like shape of the working surface of the ring cam over which the rollers pass. The pistons are biased against the working surface of the ring cam by springs (not shown) and/or by the pressure of working fluid within the working chambers. The cylinders and pistons are slightly canted so that the central axis of each piston and cylinder does not extend directly radially outwards from the centre of the ring cam. This reduces lateral forces of the pistons acting against the cylinders when the working surface is heavily loaded in use.

In use, either of the leading surfaces 70 or trailing surfaces 72 may be subject to the greatest load, in use, depending on application (for example, whether the fluid-working machine is functioning as a pump or as a motor). The axis of each of the working chambers (as defined by the path of the pistons) is typically canted away from the radius of the ring cam and towards an axis which is perpendicular to whichever of the leading or trailing surfaces are under greatest loading during normal use. For example, if only the leading surfaces are heavily loaded (e.g. the machine is rotated in direction B and used predominantly (or only) as a pump), the axis of the working chamber may be canted slightly (typically in the region of 1°-10°) clockwise (in relation to the orientation of FIG. 1(b)) towards an axis perpendicular to the leading surfaces 72.

A controller 17 is provided to read the angular position and speed of the shaft via a shaft sensor 18 and to control the low pressure valves 19 and (optionally) high pressure valves 21 for each cylinder according to a control algorithm. The low pressure valves alternately place the working chamber in fluid communication with, and isolate the working chamber from, a low pressure manifold 23. The high pressure valves alternately place the working chamber in fluid communication with, and isolate the working chamber from, a high pressure manifold 25. The manifolds are connected to sources or sinks of working fluid (not shown). The valves are ideally face-seating poppet type valves, with the low pressure valve oriented to allow fluid into the working chamber and optionally out of the chamber (when controllably held open) and the high pressure valve oriented to allow fluid out of the working chamber and optionally into the working chamber (when controllably held open).

In use, the ring cam rotates in the direction B in relation to the working chambers, and rollers 9 roll over the most leading part 60 of the piston facing surface of the leading tongue formation 44 of the trailing segment 7 before the most trailing part 62 of the piston facing surface of the trailing tongue formation 42 of the leading segment 5. Because the most leading part 60 of the piston facing surface of the trailing segment is below the piston facing surface 15 of the leading segment (which forms part of the working surface), the roller may smoothly transition from one segment to the next. Even if there is a slight mismatch between leading and trailing segments (as can result from deviations in dimensions within manufacturing tolerances), this will only lead to a slight difference in the location at which the roller transfers from one segment to the next but would not lead to jarring as the rollers would not encounter a discontinuity in the working surface.

The interlocking region is located so that the working chamber 20 is expanding when its roller passes from one segment to the next, i.e. it is located at a trailing surface 72 of the working surface, and so the force exerted on the ring cam by the pistons, through the rollers as they pass over an interlocking region, is not at a maximum.

By controlling the opening and closing of the low (and optionally high) pressure valves, the net volume of working fluid displaced by each chamber can be selected for each cycle of working chamber volume to enable the overall fluid displacement to be matched to a demand signal, such as a fluid volume demand signal or an output pressure signal. Suitable control algorithms are disclosed in EP 0 361 927, EP 0 494 236 and EP 1 537 333, the contents of which are incorporated herein by virtue of this reference.

Thus, the invention provides a mechanism to enable rollers, or other cam engaging elements, to move smoothly from one segment to next, minimising wear. However, as a plurality of segments are provided, they can be individually checked, maintained and replaced if need be.

Furthermore, the bolts 3 (functioning as attachment means) are located in bores extending from apertures 4 which are also located in the trailing surfaces 72 of the working surface, and thus the force exerted on the ring cam by the pistons, through the rollers as they pass over the apertures, is also not at a maximum.

The phase of the cycles of working chamber volume is defined by the waves in the working surface of the ring cam. In this example, the ring cam is part of a fluid working pump and so the forces acting on the ring cam from the pistons are greatest during the compression stroke of each working chamber which coincides with the rollers passing along the leading surfaces 70. If the fluid working machine was a fluid working motor (or operated for a substantial proportion of the time as a motor, or if the highest torque requirement (and thus the greatest forces transmitted to the working surface) was when operating as a motor), the bolts would instead be advantageously located in bores extending from apertures in the working surface of the leading surfaces 70. This enables the attachment means to be provided in the working surfaces (thereby enabling the ring cam and the fluid working machine to be more compact and lighter than known apparatus) while minimising wear on the rollers, or other cam engaging elements, which might otherwise result from the discontinuities caused by the apertures in the working surface.

It may be that the segments are manufactured by fracturing a continuous ring into smaller parts, for example by making a plurality of notches or imperfections in the continuous ring and then expanding or otherwise overstressing said ring to fracture it.

Figure 2:
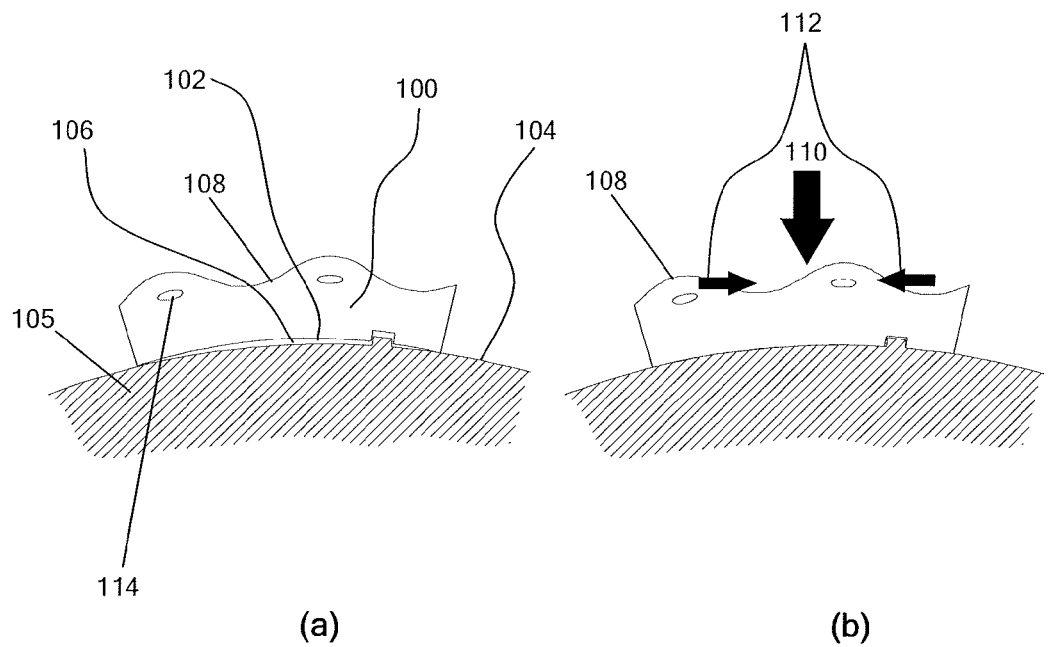
FIG. 2 shows a schematic axial section of a portion of a cam support structure and a cam segment (a) in an un-stressed state prior to being secured to the support structure and (b) secured to the support structure and in a pre-stressed state.

FIG. 2 (a) shows in exaggerated form how a segment 100 might be formed with a fixing surface (a support facing surface) 102 having a smaller radius of curvature than the outer surface 104 (functioning as a cam segment support) of the shaft 105 to which it is to be fixed, causing there to be a gap 106 between the segment and the shaft where the segment is placed against the shaft.

FIG. 2 (b) illustrates a fixing force 110 into the shaft, which is typically exerted by attachment means (for example, bolts 3 of segments 5,7 shown in FIGS. 1(a) and (b)). Fixing force 110 deforms the segment 100 to close the gap 106, bringing the segment into cooperative engagement with the outer surface 104 (as shown in FIG. 2(b)). A tangential compressive stress 112 is induced in the segment and, in particular, in the piston facing surface 108, as a result of the deformation of the segment by fixing force 110.

The tangential compressive stress is exerted generally parallel to the piston facing surface over which rollers pass in use. This tangential compressive stress increases the longevity of the rolling surface when subject to very high forces from passing rollers. Highly loaded passing rollers would otherwise cause localised compression of the rolling surface towards the shaft, which would otherwise cause tangential tensile stress in the piston facing surface. Thus, the compressive stress 112 offsets some of the tensile stress. Indeed, in some alternative embodiments, the compressive stress may exceed the expected tensile stress so that the piston facing surface is not subject to tangential tensile stresses during normal use.

Thus, the curvature of the piston facing surface of the segment, and the curvature of the opposite surface are different and so the segment must be flexed (and thereby elastically deformed) in order to be fitted to a curved cam segment support. In this case, the curvature of the cam segment support facing side of the segment is greater than the curvature of the cam segment support. In alternative embodiments, the segments may be intended to be retained on an inward facing cam segment support, so as to provide an inward facing working surface (for example in a radial piston machine where the pistons are located within the ring cam). In this case, in order that the piston facing surfaces of the cam segments may be placed under tangential compressive stress, the support facing surface of the segments may be provided with a greater radius of curvature than the fixing surface.

In comparison to known ring cams, consisting of segments secured to a support structure by flanges (or other attachment means) extending to either side of the working surface, attachment means (e.g. bolts) extending through the working (or piston facing) surface enable the piston facing surfaces of the segments to be placed in greater compression.

In general, the segment 100 has been configured such that it cannot be fitted into a ring cam without being elastically deformed to create compressive stress in the piston facing surface, and in the working surface of the assembled ring cam. The working surface of the segment (the piston facing surface minus any parts which are typically recessed below the piston facing surface of an adjacent segment in use)

defines a proportion, x, of a wave of a ring cam working surface. In the example shown in FIG. 2, this proportion is 2.00. However, the curvature of the segment underlying the working surface (i.e. ignoring parts which do not engage with the rollers or other cam engaging elements in use) is a fraction, y, of 360° which is not an integral multiple of x. For example, the curvature of the segment underlying the working surface may be 44° and so y=0.122222. The ratio x/y=16.3636(36) in this example, which is not an integer. Thus, the working surface provided by the segment is mismatched with the curvature of the segment itself and the segment cannot be used to form a ring cam having only other segments of corresponding shape, as a ring cam should have an integral number of waves.

Segment 100 is also provided with (optional) cross apertures 114, which extend through the segment generally parallel to the axis of rotation of the assembled ring cam and the piston facing surface. The cross apertures provide zones of greater compressibility than the surrounding material of the segment and facilitate deformation of the segment, enabling a given tangential compressive force to be generated with a lower fixing force. One or more cross apertures may be positioned and dimensioned to achieve a desired distribution of tangential compressive forces through the segment. For example, the position and dimensions of the cross apertures may be selected so as to concentrate compressive forces on the leading surface, or the steepest portions of the leading surfaces.

In some embodiments, the ring cam segments are formed with the cross apertures 114 located in the region of whichever of the leading face or the trailing faces of the waves which make up the ring cam the pistons will exert most force during operation. This force varies cyclically during active cycles as fluid flows into and out of working chambers in phased relationship to cycles of working chamber volume. The variation in pressure during cycles of working chamber volume depends on the function of the machine. If the machine is a pump, the apertures are located in the leading faces, so that the rollers pass over the apertures during contraction strokes, when the respective working chamber may be in fluid communication with the high pressure manifold, and the pressure within the working chamber is above the pressure of the low pressure manifold as a result. If the machine is a motor, the apertures are located in the trailing faces, so that the rollers pass over the apertures during expansion strokes, when the respective working chamber is receiving working fluid from the high pressure manifold. In both cases, during an active cycle, the working chamber is open to the high pressure manifold whenever the working chamber passes over a cross aperture.

In practice, it is the curvature of the cam segment support between fixing points which is important and the cam segment support may not have a continuous curvature, or even be a continuous surface as shown in the figures.

Although the cam segments are illustrated having cooperating formations in the form of a tongue at a first end and two tongues defining a groove at the other end, any of a wide range of other arrangements are possible. Tongues may be straight, curved, or generally triangular, for example. The cam segments may have a single tongue at either end, which tongues are adjacent each other in the assembled device, thereby forming the interlocking region in use.

In some embodiments, the ring cam segments are formed with the apertures 4 located in only whichever of the leading face or the trailing faces of the waves which make up the ring cam the pistons will exert least force during operation. This force varies cyclically during active cycles as fluid flows into and out of working chambers in phased relationship to cycles of working chamber volume. The variation in pressure during cycles of working chamber volume depends on the function of the machine. If the machine is a pump, the apertures are located in the trailing faces, so that the rollers pass over the apertures during expansion strokes, when the respective working chamber is in fluid communication with the low pressure manifold, and the pressure within the working chamber is at or below the pressure of the low pressure manifold as a result. If the machine is a motor, the apertures are located in the leading faces, so that the rollers pass over the apertures during contraction strokes, when the respective working chamber is venting working fluid to the low pressure manifold. In both cases, the working chamber is sealed from the high pressure manifold whenever the working chamber passes over an aperture. The apertures are examples of discontinuities in the working surfaces and other discontinuities, such as the interlocking regions between adjacent segments, may also be distributed in the same way.

Figure 3:
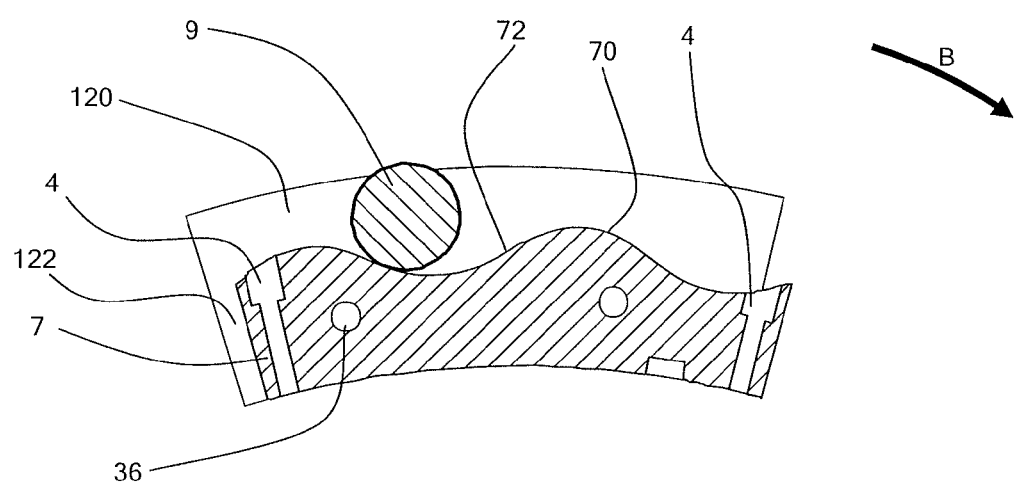
FIG. 3 is a cross-section through a section of a ring cam comprising a plurality of segments having apertures in alternate trailing faces.

With reference to FIG. 3, in some embodiments, apertures 4 are provided in only some of the trailing faces. The cam segment of FIG. 3 is especially useful in a fluid-working machine operable typically as a pump, but also operable as a motor in some conditions (for example to provide a positioning function). Thus, during pumping, the rollers only pass over apertures while the respective piston cylinder is expanding and the pressure within the working chamber is relatively low. However, during motoring, although the pressure within the working chamber will be relatively high when the rollers bear on the trailing faces during active motoring cycles, the active motoring cycles are selected to coincide with the rollers passing over the trailing faces, or those portions of the trailing faces, of the waves lacking apertures. Instead, the working chambers always execute idle strokes with no net displacement of working fluid, during cycles when they bear on trailing faces having apertures. This restricts the maximum throughput of working fluid during motoring but there are numerous applications where it is acceptable for maximum displacement during motoring to be less than maximum displacement during pumping, for example, a machine driven by the blades of a wind turbine will typically be operated as a pump but could occasionally be driven as a motor to control the location of the blades, e.g. for maintenance. In order to time active cycles to coincide with the rollers passing over trailing faces the controller refers to a database of which trailing faces include apertures (and where the apertures are located), and continuous measurements of the angular position of the ring cam received from shaft sensor 18, and takes this into account on each selection of the volume of working fluid to be displaced by each working chamber on each successive cycle of working chamber volume.

In some embodiments, the controller may cause a working chamber to execute a partial motoring cycle in which the controller closes the high pressure valve before the roller bears on an aperture (or an interlocking region, or any other discontinuity in the working surface), so that the pressure within the working chamber is limited below a threshold when the roller bears on an aperture (or an interlocking region).

In some embodiments, the controller may allow a working chamber to execute a motoring cycle while the corresponding roller passes over a trailing face including an aperture only if the pressure within the high pressure manifold is below a threshold, in which case the force bearing on the ring cam through the roller is anyway not excessively high.

Optionally, the fluid-working machine is also operable to function as a pump in a second (opposite) direction of rotation. In this case the leading faces (when the fluid working machine is rotating in a first direction) become the trailing faces (when the fluid-working machine is rotating in the second direction) and the trailing faces (when the fluid working machine is rotating in a first direction) become the leading faces (when the fluid-working machine is rotating in the second direction). In some embodiments, when rotating in the second direction, the controller may allow a working chamber to execute a pumping cycle while the corresponding roller passes over a trailing face including an aperture only if the pressure within the high pressure manifold is below a threshold, in which case the force bearing on the ring cam through the roller is anyway not excessively high. In some embodiments, when rotating in the second direction, the controller may allow a working chamber to execute a partial pumping cycle in which the controller closes the low pressure valve after the roller bears on an aperture (or an interlocking region), so that the pressure within the working chamber is below a threshold when the roller bears on an aperture (or an interlocking region).

For a machine operated predominantly as a motor, and in some conditions as a pump, the apertures can be located in some of the leading rather than some of the trailing faces.

The ring cam further comprises side plates (on one or, more preferably, both sides of the ring cam) extending around the circumference of the ring cam (and each side plate typically also abutting an edge of the working surface of the ring cam), which prevent the rollers from sliding off the wave-like surface of the ring cam. In embodiments with two or more ring cams, there may be one side plate positioned intermediate two cam rings which functions to prevent rollers from sliding off both cam rings. Alternatively, each of the two or more cam rings may have separate side plates.

The side plates may be unitary, or may be segmented as shown in FIG. 3. In the embodiment shown in FIG. 3, ring cam segment 7 is secured to a side plate segment 120 (and typically to two side place segments, to either side of the wave like surface of the segment). In alternative embodiments there may be fewer, or more, side plate segments disposed around each side of the circumference of the or each ring cam than there are ring cam segments.

The side plates are held to the segment 7 by bolts 36 extending through cross bolt holes. The bolts may each extend through more than one ring cam (or ring cam segment) or more than one side plates (or side plate segments).

The side plate segments of the ring cam may be angularly offset from the cam segments so that each side plate overlaps two (or more) segments of the assembled ring cam. Thus, and in the assembled ring cam, the joint between side plate segments does not align or overlap with the joint between segments and the overlapping portion 122 of a side plate segment secured to a ring cam segment may be used to axially (i.e. with respect to the shaft) align the cam segment to an adjacent cam segment (for example during assembly and maintenance, or to reduce wear caused by motion of adjacent ring cam segments in relation to one another, when forces are applied to the wave like surface, in use). In some embodiments the side plates may be fixed to the shaft, or fixed relative to the valves and working chambers such that the cam segments move between the side plates.

The ring cam of the present invention is especially useful as a component of large fluid working machines where access may be difficult and a long ring cam working life is important. For example, the ring cam may be part of a pump within the nacelle of a wind turbine tower (which are typically in excess of 50 m in height), or an offshore wind turbine tower, with the drive shaft coupled to the blades of a wind turbine, and where it is not practicable to remove the fluid-working machine, or the wind turbine blades, for maintenance or repair.

Further variations and modifications may be made within the scope of the invention herein disclosed.

The invention claimed is:

1. A fluid-working machine comprising:
a ring cam, having a working surface, and
at least one piston, at least one respective cam engaging element and at least one respective working chamber, and
wherein the ring cam comprises at least two segments;
each said segment having a leading cooperating formation at a leading region, and a trailing cooperating formation at a trailing region; each leading cooperating formation in cooperative engagement with said trailing cooperating formation of an adjacent segment of said at least two segments at an interlocking region;
each said segment having a piston facing surface,
the cam working surface being a portion of the piston facing surfaces which operatively engages with the at least one piston by way of said at least one respective cam engaging element so as to couple reciprocating motion of the at least one piston to rotation of the ring cam relative to the at least one piston;
each said leading and trailing cooperating formation having a portion of the piston facing surface;
wherein across each interlocking region,
a portion of the piston facing surface at the leading cooperating formation forms a part recessed from the working surface of the trailing cooperating formation, and
a portion of the piston facing surface at the trailing cooperating formation forms a part recessed from the working surface of the leading cooperating formation.

2. A fluid-working machine according to claim 1, wherein each cooperating formation comprises a tongue.

3. A fluid-working machine according to claim 1, wherein the working surface is wavelike.

4. A fluid-working machine according to claim 1, wherein some or all segments comprises a slip-resisting formation, to resist slip of the segment relative to a cam segment support.

5. A fluid-working machine according to claim 1, wherein, across each interlocking region, the piston facing surfaces of the cooperating formations of adjacent segments cross at an angle of less than 180.0°.

6. A fluid-working machine according to claim 1,
wherein each said cam engaging element does not bear with maximum force on any of the interlocking regions every cycle of working chamber volume, and
wherein the fluid-working machine is operable as a pump and a motor in a first direction of rotation, the fluid working machine operable such that each cam engaging element does not bear with maximum force on any of the interlocking regions when the respective working chamber is contracting, each said working chamber operable to execute a pumping cycle during every cycle of working chamber volume, and each said working chamber operable to execute a motoring cycle during cycles of working chamber volume in which the cam engaging element does not bear with maximum force on any of the interlocking regions.

7. A fluid-working machine according to claim 1,
wherein each said cam engaging element does not bear with maximum force on any of the interlocking regions every cycle of working chamber volume, and
wherein the fluid-working machine is operable as a pump and a motor in a first direction of rotation, the fluid working machine operable such that each cam following element does not bear with maximum force on any of the interlocking regions when the respective working chamber is expanding, each said working chamber operable to execute a motoring cycle during every cycle of working chamber volume, and each said working chamber operable to execute a pumping cycle during cycles of working chamber volume in which the cam engaging element does not bear with maximum force on any of the interlocking regions.

8. A fluid-working machine according to claim 1, further comprising a controller operable to control a working fluid pressure,
wherein each said segment defines a plurality of waves of the working surface, such that the cam engaging element of each respective working chamber does not bear with maximum force on any of the interlocking regions every cycle of working chamber volume, in use, and wherein the controller is operable to limit the working fluid pressure in each said working chamber when each said cam engaging element bears on any of the interlocking regions, in comparison to the working fluid pressure in the working chamber when the respective cam engaging element bears upon another region of the working surface.

9. A fluid-working machine according to claim 8, wherein the controller is operable to limit the working fluid pressure in each said working chamber by selection of a net volume of fluid to be displaced during a cycle of working chamber volume.

10. A fluid-working machine according to claim 8, wherein the controller is operable to limit the working fluid pressure in each said working chamber by selection of a working chamber to undertake an idle cycle.

11. A kit of parts which, when assembled, forms a fluid-working machine according to claim 1.

12. A method of operating a fluid-working machine according to claim 1, the method comprising causing relative rotation of the ring cam and the at least one piston such that the at least one cam engaging element passes smoothly from the leading cooperating formation of a first segment to the trailing cooperating formation of a second segment.

13. A method according to claim 12, wherein each said segment defines a plurality of waves of the working surface, such that the cam engaging element of each respective working chamber bears on one of the interlocking regions every two or more cycles of working chamber volume, the method comprising selecting a volume of working fluid to be displaced by each said working chamber, on a cycle by cycle basis, so as to limit a working fluid pressure in each said working chamber when the respective cam engaging element bears on one of the interlocking regions, in comparison to the working fluid pressure in the working chamber when the cam engaging element bears upon another region of the working surface.

\* \* \* \* \*